United States Patent

[11] 3,600,956

[72] Inventor Kurt Boguth
 Duisburg-Wanheimerort, Germany
[21] Appl. No. 815,913
[22] Filed Apr. 14, 1969
[45] Patented Aug. 24, 1971
[73] Assignee Wilhelm Weller, Herstellung und Vertrieb
 von Strassen-Walzen, Gesellschaft mit
 beschrankter Haftung
 Dusseldorf, Germany
[32] Priority Apr. 13, 1968
[33] Germany
[31] P 17 59 255.1

[54] APPARATUS FOR PRODUCING VIBRATIONS FOR VIBRATORS FOR USE IN CONNECTION WITH CONSTRUCTION WORK
 9 Claims, 7 Drawing Figs.
[52] U.S. Cl. .................................................. 74/61,
 209/366.5
[51] Int. Cl. ............................................... F16h 33/00,
 B07b 1/44
[50] Field of Search ........................................ 74/325, 61;
 209/366.5, 367; 198/220 DB

[56] References Cited
 UNITED STATES PATENTS
 1,704,890  3/1929  Gerson .................. 74/325

| 2,174,191 | 9/1939 | Keller | 74/325 |
| 2,913,912 | 11/1959 | Radermacher | 74/61 |
| 2,937,537 | 5/1960 | Woll | 74/61 |
| 3,385,119 | 5/1968 | Berger | 74/61 |

FOREIGN PATENTS
 675,826  12/1963  Canada ...................... 74/61

Primary Examiner—William F. O'Dea
Assistant Examiner—Wesley S. Ratliff, Jr.
Attorney—Walter Becker ABSTRACT: An apparatus for producing vibrations in vibrators for use in construction work, especially in connection with the building of streets and highways, in which the torque of a driving motor is through a change gear transmission with at least two transmission ratios conveyed to an exciter shaft which in addition to a fixed rotary weight has arranged thereon at least one radially displaceable centrifugal weight connected to a counter weight and supported by the exciter shaft through the intervention of spring means in such a way that the center of gravity of the unbalance producer composed of the centrifugal weight and counter weight will at the smaller transmission ratio be located approximately on the axis of rotation of the exciter shaft but will be spaced to a greater extent therefrom at the higher transmission ratio.

PATENTED AUG24 1971

INVENTOR.
Kurt Boguth
BY

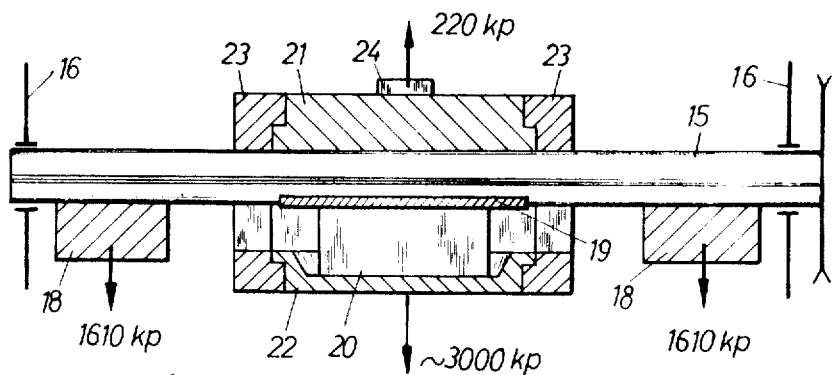
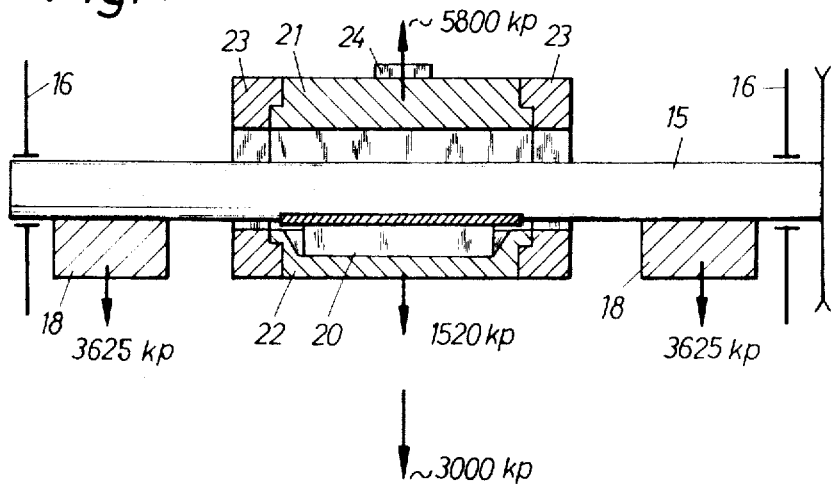

INVENTOR.
BY Kurt Boguth

APPARATUS FOR PRODUCING VIBRATIONS FOR VIBRATORS FOR USE IN CONNECTION WITH CONSTRUCTION WORK

The present invention relates to an apparatus for producing vibrations in vibrators used in connection with construction work, especially in connection with the building of streets and highways, according to which the vibrations are produced by circulating movements of unbalanced masses and are conveyed to the surface of the respective material to be compacted. Such apparatus is intended in particular for all types of vibrating rollers, but may also be used for vibrating plates, vibrating planks, or the like.

During the last years, the field of employment for vibrating devices has greatly increased. Vibrating rollers are employed in connection with rock layers and the vibrating into place of paving stones, the compacting of various types of road beds, and among others the building in of bituminous layers. In this connection it is necessary to adapt the vibrating operation to the properties of the respective material to be compacted. Coarse grained material and lower bottom layers can, for instance, best be compacted by vibrators with high amplitude and low frequency, whereas fine granular material and bottom layers near the surface of the road to be built require lower amplitudes and higher frequencies.

With vibrating rollers, it is known to vary the vibrating characteristics. This is effected in most instances by varying the speed of the exciting shaft carrying the rotating weights. Such an arrangement, however, has the drawback that with the change in the speed also the centrifugal force for producing the vibrations changes in its magnitude. Since the change in centrifugal force is effected in conformity with a square function, it is impossible to adjust the vibrating characteristics in the desired manner.

In order to be able to obtain a satisfactory change in the vibrating characteristics, a device for producing vibrations has become known according to which, in addition to a change in the speed, there also exists the possibility of adjusting the magnitude of the unbalance by varying the distance between the circulating weight and the axis of rotation of the exciting shaft. Such an arrangement, however, has the drawback that the adjustment of the location of the circulating weight with regard to the exciting shaft has to be carried out with additional devices while the machine is at a standstill. Aside from the fact that such an arrangement has a complicated structure and is liable to disorders, the awkward operation of the device frequently brings about that only the speed is changed while an adjustment of the radial distance of the circulating weight from the axis of rotation of the exciting shaft is not effected. All heretofore known devices of the type involved additionally have the drawback that the speed of the exciting shaft is changed by changing the speed of the driving motor whereby it is impossible to be able to take advantage of the full torque of the driving machine at all speeds.

It is, therefore, an object of the present invention to provide an apparatus for producing vibrations for vibrating devices, especially in connection with the building of streets and highways, which while permitting a continuous exploitation of the full torque of the driving motor, also affords the possibility of varying the amplitude of the vibrations stepwise while the centrifugal force remains approximately constant.

This object and other objects and advantages of the invention will appear more clearly from the following specification in connection with the accompanying drawings, in which:

FIG. 3 represents a diagrammatic illustration of the exciter shaft rotating at low speed.

FIG. 4, similar to FIG. 3, shows an exciter shaft which, however, rotates at higher speed.

Figure 6:
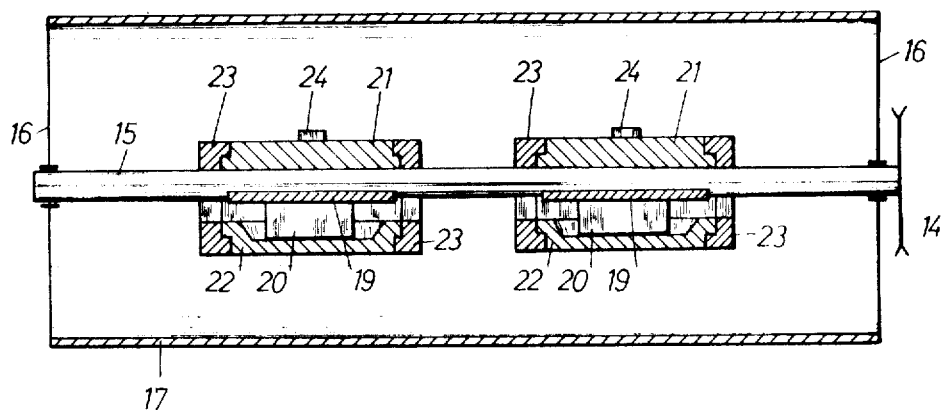
Figure 7:
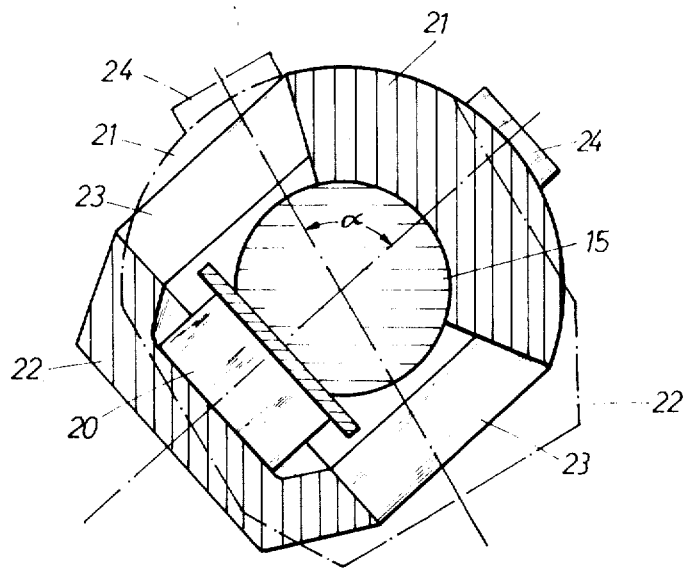

FIGS. 5–7 show some modifications over FIGS. 1–4.

The device according to the present invention is characterized primarily in that the torque exerted by the driving motor is through a control drive with at least two transmissions conveyed to the exciter shaft and is furthermore characterized in that in addition to the fixed rotating weight at least one radially displaceably mounted centrifugal weight is arranged on the exciter shaft. The centrifugal weight is connected to a counterweight and by means of a spring is supported relative to the exciter shaft in such a way that the center of gravity of the unbalance producer composed of the centrifugal weight and the counterweight is with the lower transmission step located nearly on the axis of rotation of the exciter shaft whereas with the higher transmission ratio, the force of the spring is overcome by the higher centrifugal weight, and the centrifugal weight is displaced radially outwardly.

According to a further feature of the invention, the centrifugal weight which preferably as to its displaceability is limited by a fixed or adjustable abutment, is offset relative to the fixed rotating weight by 180° and is arranged on the exciter shaft. The mass of the rotating weight and the mass as well as the stroke of the centrifugal weight are selected with regard to each other in such a way that with both transmission ratios there is obtained approximately the same centrifugal force. In order to be able precisely to predetermine the start of the radial displacement of the centrifugal weight in response to the increasing speed, it is suggested, in conformity with a further feature of the present invention, to arrange an additional weight acting as control mass on the centrifugal weight.

According to a further development of the present invention, for a device with a control transmission having more than two transmission ratios, it is suggested to replace the spring between the centrifugal weight and the exciter shaft by a plurality of serially arranged springs of different spring force in order to obtain a stepwise radial displacement of the centrifugal force in conformity with the speed stages. The same result may, according to a further feature of the invention, be realized by arranging a plurality of unbalance producers on the exciter shaft which unbalance producers comprise a centrifugal weight, a counterweight and a spring. These unbalance producers may, in conformity with the invention, be so offset with regard to each other and mounted on the exciter shaft that with all transmission ratios approximately the same centrifugal force will be realized. These unbalance producers may be offset relative to each other by 180° but may also be offset with regard to each other by other angles while in the last mentioned instance the influences of the sine functions have to be taken into consideration when adding centrifugal forces.

Figure 1:
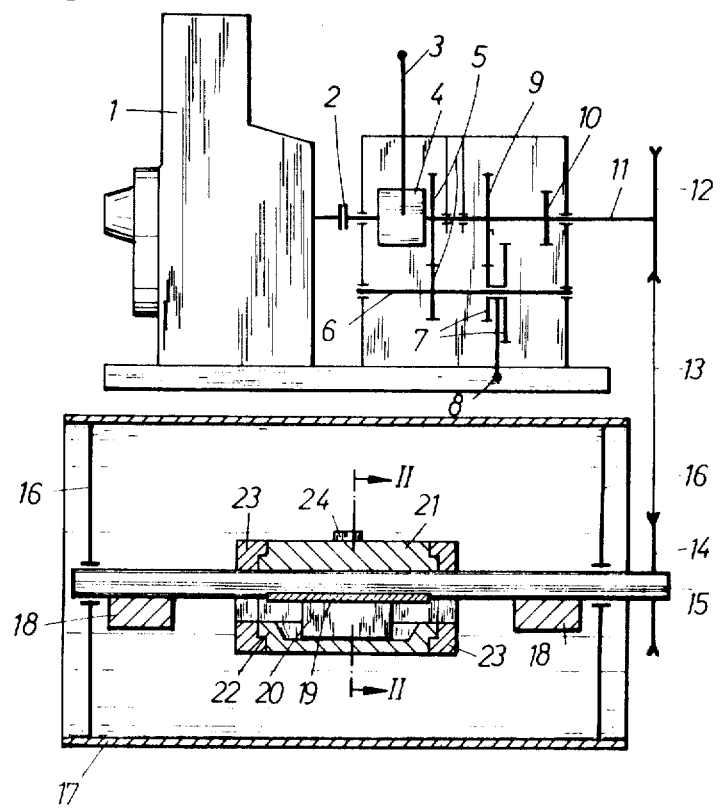
FIG. 1 represents a diagrammatic longitudinal section through a vibrating roller and through the drive for the device for producing vibrations.
Figure 2:
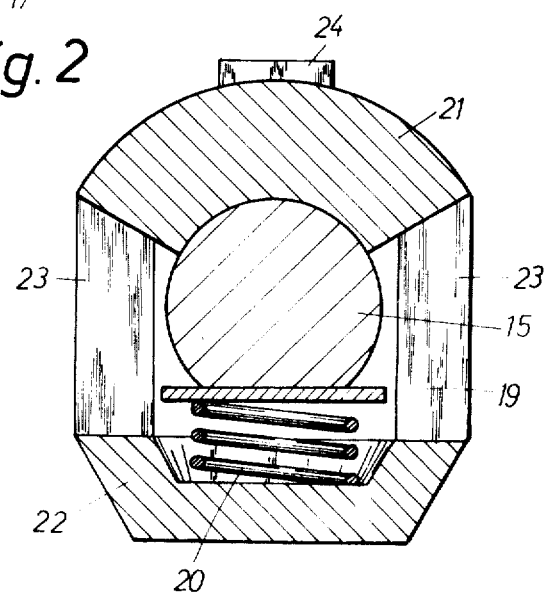
FIG. 2 is a cross section taken along the line II—II of FIG. 1, but on a larger scale than that of FIG. 1.

Referring now to the drawings in detail, FIG. 1 shows those portions of a vibrating roller necessary for understanding the device according to the present invention. The torque of a drive motor 1 is through the intervention of an elastic coupling 2 conveyed to a clutch 4 which is adapted to be engaged and disengaged by means of a control lever 3. When the clutch 4 is engaged, the torque of the drive motor 1 is through the intervention of a pair of gears 5 conveyed to a shaft 6 on which a pair of gears 7 is axially displaceably arranged. From the pair of gears 7, which is displaceable by means of a lever 8, the torque can be conveyed either through a gear 9 or a gear 10 to an output shaft 11.

Connected to the output shaft 11 is an output pulley 12 which through the intervention of a V-belt 13 is drivingly connected to a drive wheel 14 which in its turn is connected to an exciter shaft 15. Shaft 15 is rotatably journaled in the bearing means 16 of a roller bandage 17, independently of a guiding or driving movement of the roller bandage 17.

Fixedly arranged on the exciter shaft 15 are two rotating weights 18 located in the vicinity of the bearing means 16. Between said fixed weights 18, the exciter shaft 15 is provided with a plate 19 against which rests one end of a spring 20. The other end of spring 20 engages a counterweight 22 which through the intervention of clamping yokes 23 is connected to a centrifugal weight 21. The centrifugal weight 21 is provided with an additional weight 24.

When the clutch 4 is engaged which is actuated while the driving motor 1 is rotating, the driving motor 1 which runs always with maximum torque and at constant speed drives the exciter shaft 15 at a predetermined speed. By means of the displaceable gear pair 7, the transmission ratio determined by the dimensions of the gears 9 and 10 and of the gear pair 7 can be selected. According to the illustration of FIG. 1, the exciter shaft 15 is driven at low speed.

FIG. 3 diagrammatically illustrates the conditions which are encountered with an embodiment according to which the exciter shaft 15 rotates at low speed. At a speed of approximately 2000 r.p.m., each of the two fixed rotating weights 18 produces a centrifugal force of 1610 kp, in conformity with the formula:

$$P = m \times r \times (\pi \times n/30)^2$$

The unbalance producer composed of a centrifugal weight 21, a counterweight 22, clamping members 23 and spring 20 and located between the two fixed weights 18 is balanced at the speed of 2000 r.p.m. with the exception of the additional weight 24. This will be realized by the fact that spring 20 rests on the plate 19 on the exciter shaft 15 presses the counterweight 22 away from the exciter shaft 15 and thus moves the centrifugal weight 21 into engagement with the exciter shaft 15 as shown in FIGS. 1 and 3. Thus, merely a centrifugal force is obtained by the additional weight 24 acting as control mass, said centrifugal force having the magnitude of 220 kp. This centrifugal force of the weight 24 is, however, not sufficient to compress spring 20 because spring 20 in the illustrated position has a preload of 400 kp. Summarizing the situation, it will be realized that the exciter shaft is, by the fixed rotating weights 18 loaded with a total of 1610 kp and offset by 180°, by the additional weight 24 loaded with 220 kp. The unbalance thus amounts to a total of approximately 3000 kp at a speed of approximately 2000 r.p.m.

If the speed of the exciter shaft 15 is increased by causing the larger gear of the gear pair 7 to mesh with the gear 10, the condition illustrated in FIG. 4 is obtained with regard to the unbalance producer located between the fixed rotating weights 18. With the selected speed of approximately 3100 r.p.m., the auxiliary weight 24 produces a centrifugal force of approximately 530 kp. This centrifugal force thus overcomes the preload of spring 20 which amounts to 400 kp. As a result thereof, a radial displacement of the entire unbalance producer occurs which is composed of centrifugal weight 21, counterweight 22 and clamping members 23, while simultaneously spring 20 is compressed. This radial displacement is limited by a structurally fixed abutment. It is a matter of course that the spring 20 is so designed that it will permit a complete radial displacement up to the abutment.

In their radially displaced positions, the centrifugal weight 21, the additional or auxiliary weight 24 and the corresponding parts of the clamping members 3 exert a centrifugal force of approximately 5800 kp, whereas the counterweight with the other parts of the clamping members 23 produces a counterforce of approximately 1520 kp. From the displaceable unbalance producer thus results a centrifugal force of approximately 4280 kp which acts counter to the centrifugal force of the two fixed rotating weights 18. Since these rotating weights 18 each produce approximately 3625 kp, a total of 7250 kp, there will be obtained a centrifugal force of 2970 kp (again approximately 3000 kp) at the exciter shaft 15 rotating at 3100 r.p.m.

The illustrated embodiment thus shows that by a proper selection of the weight and the spring properties, it will be possible at different speeds of the exciter shaft 15 to obtain approximately the same centrifugal force. When the centrifugal force remains constant and the speeds differ, different amplitudes of the vibrations are obtained, in the present case at the lower speed a high amplitude, and at the higher speed a low amplitude.

It is, of course, also possible when more than two transmissions are contained in the control drive, to replace the spring 20 by a plurality of serially arranged springs 20a, 20b of different spring force (shown in FIG. 5) so that the radial displacement will be effected stepwise in conformity with the respective speed. Furthermore, a plurality of unbalance producers composed of centrifugal weight, counterweight and spring may be arranged on the exciter shaft as shown in FIG. 6. These unbalance producers may be offset by 180° or by other angles. In the last mentioned instance, it is to be understood that the influence of the sine functions has to be taken into consideration when adding centrifugal forces. Preferably the unbalance producers are offset to each other on shaft 15 in such a manner that at all transmission ratios substantially the same centrifugal force will be obtained. Such an arrangement is shown by way of example in FIG. 7.

As will be evident from the above, the device according to the invention has the advantage that in spite of different amplitudes and frequencies of the vibrations, the produced centrifugal force remains approximately constant so that the vibrating device designed for a certain centrifugal force can always be used with its optimum working range which is determined primarily by the load at which the device rests on the material to be compacted and by the produced centrifugal force.

For the design of the device it is also advantageous that the drive motor, in spite of different speeds of the exciter shaft, can always be operated at the same speed and thus at maximum torque whereby it will be possible also to employ smaller and less expensive driving engines.

The reduction in the magnitude of the unbalance with increasing speed will, with the device according to the present invention, be effected automatically by the control drive when adjusting the speed of the exciter shaft without the necessity of stopping the vibrating device and without the necessity of having to actuate a specific adjusting device.

It is, of course, to be understood that the present invention is, by no means, limited to the particular showing in the drawings but also comprises any modifications within the scope of the appended claims.

What I claim is:

1. An apparatus for producing vibrations in vibrators for use in construction work, especially in connection with the building of streets and highways, which includes: motor means, exciter shaft means, variable change gear transmission means interposed between and operatively connected to said motor means and said shaft means, said transmission means including gear means with at least two different transmission ratios, clamping means and fixed rotary weight means respectively fixedly connected to said shaft means at axially spaced locations thereon, at least one movable centrifugal weight means radially displaceably arranged on said shaft means, counterweight means for and rigidly connected to said centrifugal weight means collectively confined by said clamping means with respect to said shaft means, and spring means continuously urging said centrifugal weight means exclusively toward said shaft means with said clamping means thereon, said centrifugal weight means and said counterweight means together forming an unbalance producer having its center of gravity located at least nearly on the axis of rotation of said shaft means when said transmission means is set for its smaller transmission ratio whereas when said transmission means is set for a higher transmission ratio the center of gravity of said unbalance producer is located in considerably greater spaced relationship to the axis of rotation of said shaft means in view of the higher centrifugal force of said centrifugal weight means directly overcoming said spring means and being displaced only radially outwardly due to clamping means restraint thereon.

2. An apparatus for producing vibrations in vibrators for use in construction work, especially in connection with the building of streets and highways, which includes: motor means, exciter shaft means, variable change gear transmission means interposed between and operatively connected to said motor means and said shaft means, said transmission means including gear means with at least two different transmission ratios, fixed rotary weight means fixedly connected to said shaft means, at least one movable centrifugal weight means radially displaceably arranged on said shaft means, counterweight means for and connected to said centrifugal weight means, spring means continuously urging said centrifugal weight means toward said shaft means, said centrifugal weight means and said counterweight means together forming an unbalance producer having its center of gravity located at least nearly on the axis of rotation of said shaft means when said transmission means is set for its smaller transmission ratio whereas when said transmission means is set for a higher transmission ratio the center of gravity of said unbalance producer is located in considerably greater spaced relationship to the axis of rotation of said shaft means in view of the higher centrifugal force of said centrifugal weight means overcoming said spring means and being displaced radially outwardly, and additional weight means associated with centrifugal weight means and forming a control mass.

3. An apparatus according to claim 2, which includes abutment means for limiting the radial displaceability of said centrifugal weight means.

4. An apparatus according to claim 2, in which said centrifugal weight means is offset by substantially 180° with regard to said fixed rotary weight means.

5. An apparatus according to claim 4, in which the mass of said fixed rotary weight means and the mass and the radial stroke of said centrifugal weight means are so adapted with regard to each other that approximately the same centrifugal force is obtained at the lower transmission ratio and at the higher transmission ratio of said transmission means.

6. An apparatus according to claim 2, in which said additional weight means is adjustable relative to said centrifugal weight means.

7. An apparatus according to claim 2, in which said change gear transmission means has more than two transmission ratios, and in which said spring means includes a plurality of serially arranged springs of different spring force.

8. An apparatus according to claim 7, which includes a plurality of unbalance producers each of which comprises centrifugal weight means, counterweight means and spring means arranged on said shaft means.

9. An apparatus according to claim 7, in which said unbalance producers are provided in offset arrangement on said shaft means in such a way that approximately the same centrifugal force is obtained at all transmission ratios.